United States Patent [19]

Siegel

[11] Patent Number: 4,595,217

[45] Date of Patent: Jun. 17, 1986

[54] COUPLING MEMBER FOR VESSELS FOR USE IN TWO-WAY EXTRACTION SYSTEMS

[75] Inventor: Wilhelm Siegel, Mörfelden, Fed. Rep. of Germany

[73] Assignee: Merck Patent Gesellschaft mit beschrankter Haftung, Darmstadt, Fed. Rep. of Germany

[21] Appl. No.: 576,502

[22] Filed: Feb. 2, 1984

[51] Int. Cl.⁴ .............................................. F16K 55/00
[52] U.S. Cl. ......................................... 285/25; 285/12; 285/28; 285/32; 285/177; 285/354; 285/137.1; 285/918
[58] Field of Search ...................... 285/12, 25, 28, 32, 285/131, 137 R, 175, 177, 347, 354, 386, 423, DIG. 19

[56] References Cited

U.S. PATENT DOCUMENTS

| | | | |
|---|---|---|---|
| 1,615,536 | 1/1927 | Del Mar | 285/32 |
| 1,937,982 | 12/1933 | Rudolph | 285/12 |
| 4,247,135 | 1/1981 | Weirich et al. | 285/354 |
| 4,291,903 | 9/1981 | Fields | 285/423 X |
| 4,345,783 | 8/1982 | Bergstrand | 285/12 |

*Primary Examiner*—Richard J. Scanlan, Jr.
*Attorney, Agent, or Firm*—Millen & White

[57] ABSTRACT

This invention relates to a coupling member for use in the liquid-tight and gas-tight connection of vessels, of different sizes to a two-way extraction system. The coupling part comprises two parts, a cylindrical adaptor part and a part comprised of a union nut. The cylindrical adaptor part has, on its side facing the extraction system, a diameter compatible with the extraction system, and the side facing the vessel mouth, a diameter compatible with the vessel mouth. Sealing elements are provided for use with the vessel mouth for sealing thereof with the coupling member. The union nut has an inner thread adapted to couple to the vessel mouth and an outer thread adapted to couple to the extraction system.

21 Claims, 2 Drawing Figures

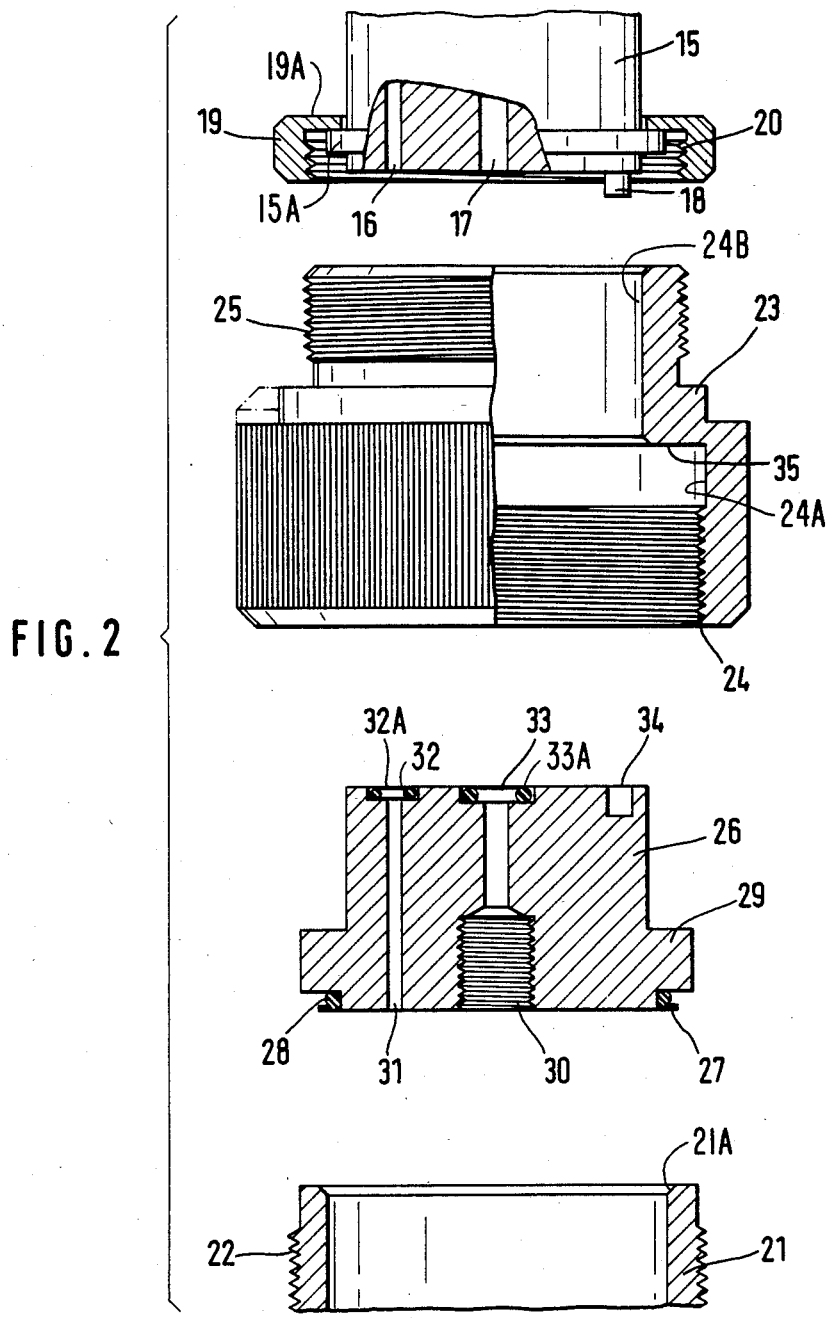

COUPLING MEMBER FOR VESSELS FOR USE IN TWO-WAY EXTRACTION SYSTEMS

BACKGROUND OF THE INVENTION

This invention relates to a coupling member for use in the liquid-tight and/or gas-tight connection of vessels, especially of bottles, of different sizes to a two-way extraction system.

Vessels equipped with coupling members for connection to extraction systems are known in the prior art. However, these vessels are very expensive to manufacture and the coupling parts can only be used on the vessels especially adapted for this purpose. An additional problem presented by these devices is that in the case of vessels filled with liquids, although the coupling parts provide a sufficient seal against the escape of liquid, they do not always adequately prevent the escape of vapors or gases evolving from the liquid.

Oftentimes this presents a high safety risk, especially in the storage and transportation or the use of vessels containing highly reactive chemicals, for example, acid chlorides or the like.

SUMMARY OF THE INVENTION

It is thus an object of one aspect of this invention to provide a coupling member for vessels which is simple and economical to manufacture.

It is also an object of another aspect of the invention to provide such a coupling member capable of effecting a reliable seal both against liquids and against gases, and at the same time which can be adapted, without a high outlay in costs, to different size vessel openings, so that the same extraction system can be used for different size vessels.

Still another object of an aspect of the invention is to provide the combination of an extraction system, the coupling member and the vessel.

Upon further study of the specification and appended claims, further objects and advantages of this invention will become apparent to those skilled in the art.

To attain these objects there is provided a coupling member for effecting the liquid-tight and gas-tight connection of vessels, especially bottles, of different sizes and to a two-way extraction system. This coupling member comprises two parts, a first part which is an adaptor part and a second part, in the shape of a union nut. The first part, i.e., the adaptor part, is cylindrical and has, on its side facing the extraction system, a diameter compatible with the extraction system, and on its side facing the vessel mouth, a diameter compatible with the vessel mouth. The coupling member also includes sealing elements adapted for use in association with the vessel mouth, and the union nut has an inner thread adapted to couple to the vessel mouth, and an outer thread adapted to couple to the extraction system.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein FIG. 2 is a side exploded view, in partial cross-section, of a coupling part which is adapted to a wide vessel mouth.

DETAILED DISCUSSION OF THE INVENTION

Figure 1:
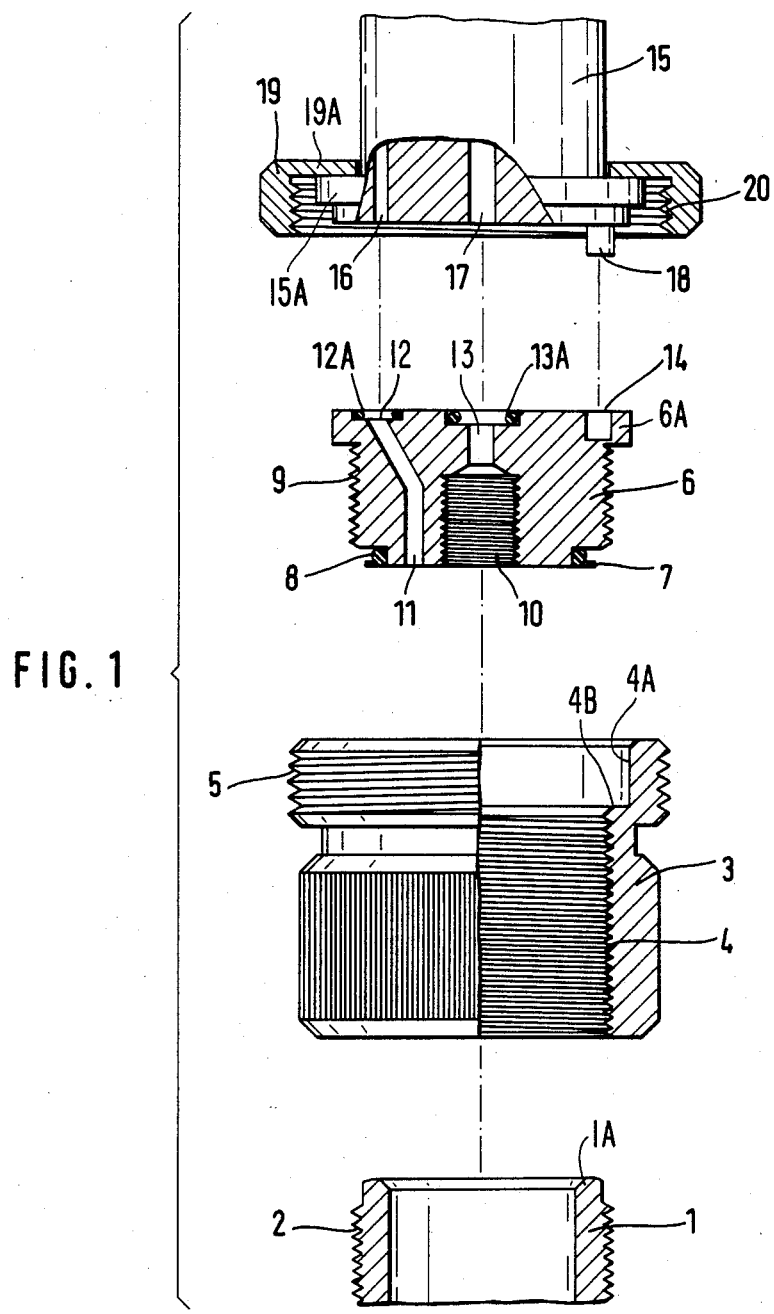
FIG. 1 is a side exploded view, in partial cross-section, of a coupling part which is adapted to a relatively narrow vessel mouth.

FIGS. 1 and 2 show a conventional extraction system, denoted by 15, and including bores 16 and 17 for extracting a vessel's contents, and adapted for being fitted by means of the coupling members of the invention to vessel mouths 1 and 21 of different sizes. The extraction system 15, which has connection pieces and shut-off cocks, is a conventional component. Extraction systems of this kind are offered commercially by Synthatron Corp. 50 Intervale Road, Parsippany, N.J. 07054. The vessel mouths 1 and 21 each have seal seats 1A and 21A at the entrances thereto.

The coupling member is made up of two parts, i.e., a first union nut 3 and 23 and an adaptor 6 and 26. The union nut 3 and 23 has an inner thread 4 and 24, forming an internally threaded portion by means of which it is connected to the vessel mouth 1 and 21 which has an outer thread 2 and 22. The union nut 3 and 23 also includes an outer thread 5 and 25 to which the extraction system 15 can be fastened by means of a second union nut 19 having an inner thread 20 and which is freely rotably movable around and associated with the extraction system 15. This advantageous feature of the coupling member has not been known hitherto. In the embodiment of FIG. 1, the first union nut 3 has a smooth bore portion 4A and a shoulder 4B facing away from the bottle mouth 1. In the embodiment of FIG. 2, the first union nut 23 has a first smooth bore portion 24A and a second smooth bore portion 24B.

The adaptor 6 and 26 has, compatible with the bores 16 and 17 of the extraction system, bores 10 and 11 for extracting the contents of the container. The bore 10 is adapted to receive a riser pipe or dip pipe.

The diameter of the bores are adapted in such a way that the liquid content of the vessel can be filled in through bore 17 and the pipe which can be screwed into bore 10 or 30, during which filling the gas contained in the vessel can escape through bore 16 and 11 or 31, and that for the extraction of the liquid from the vessel and inert gas can be pressed into the vessel through bore 16 and 11 or 31, thus forcing the liquid through the riser pipe and bore 17.

Furthermore, the adaptor 6 and 26 can either be screwed into the union nut 3 and 23 by means of a thread 9, which interacts with the inner thread 4 of the union nut 3, or else is simply pushed to be wedged into it, with a projection 29 of the adaptor 26 being fixed against an abutment 35 of the union nut 23. In the embodiment of FIG. 1, the flange 6A on the adaptor is stopped by the shoulder 4B on the first union nut 3. In either case, when the union nut 3 and 23, together with the adaptor 6 and 26, is screwed into the vessel mouth 1 and 21, the sealing lip 7 and 27, assisted by the sealing ring 8 and 28 is pressed onto the vessel mouth 1 and 21, with a resulting reliable seal having been achieved.

For the purpose of transporting the vessel when filled, the coupling member can be closed by means of a simple screw cap which is not shown here. To ensure at the same time that the bores 10, 11, 30 and 31 are sealed off, recesses 12, 13, 32 and 33 for sealing elements, for example 0-rings, 12A and 13A and 32A and 33A are provided associated with the bores 10, 11, 30 and 31. The final consumer then merely has to exchange the closing cap with the extraction system 15 which is available to him or which is also supplied, and which is fastened by means of the second union nut 19 to the outer thread 5 and 25 of the first union nut 3 and 23. The positioning pin 18, which engages in corresponding bore 14 and 34, ensures at the same time that the bores 10, 11, 30 and 31 in the adaptor 6 and 26 coincide with the bores 16 and 17 in the extraction system. Such a positioning pin has not been used with known extraction systems. The second union nut 19 has an annular flange 19A integral therewith which abuts a flange 15A on the extractor 15.

As a result of the simple design of the coupling member according to the invention, which requires only a few sealing elements, a very reliable seal can be achieved. Furthermore, the coupling member can be adapted, without large expense and technical redesign to vessels of any type and size, and because of the standard shape of the side of the coupling member facing the extraction system, a single extraction system can be used for vessels of different sizes. The connection between the coupling member and the extraction system is possible by means of a simple screw connection.

The coupling member is suitable for use in connection with conventional vessels having a threaded connection in all sizes and made of any appropriate material for example, plastic, glass or metal. The coupling member itself can, depending on the intended use, also be made of all conventional appropriate materials. It is only necessary to ensure that the material used is inert to the contents of the vessel. For example when used in vessels containing highly reactive chemicals such as, for example, acid chlorides, especially, for example, silicon tetrachloride and the like, the coupling member may be made of a high-quality chemically resistant plastic, such as a polytetrafluoroethylene/ethylene-propylene-diene polymer which has been proven especially appropriate for use with the above-enumerated chemicals.

Thus, the invention provides a highly advantageous new device.

From the foregoing description, one skilled in the art can easily ascertain the essential characteristics of this invention, and without departing from the spirit and scope thereof, can make various changes and modifications of the invention to adapt it to various usage and conditions.

What is claimed is:

1. A coupling member for use in the liquid-tight and gas-tight connection of vessels of varying sizes with a two-way double bore extraction system, said coupling member comprising two parts, an adaptor and union nut means, said adaptor being cylindrical having a lateral bore and a central bore therethrough and having, on its face connectable with the extraction system, a diameter compatible therewith, and on its opposite face connectable with a vessel mouth, a diameter compatible therewith, sealing means associated with the adaptor for effecting sealing thereof with the vessel mouth and said union nut means having a first connecting portion having means for being coupled directly to the vessel mouth and a second connecting portion rotatably movable with respect to the first connecting portion adapted for being coupled to the extraction system, and said first connecting portion containing said adaptor.

2. A coupling member according to claim 1, wherein said sealing means comprises a sealing lip having an inserted sealing ring.

3. A coupling member according to claim 1, wherein said adaptor includes bores arranged to match corresponding bores in the extraction system, and a recess for receiving therein a positioning pin, projecting from the extractor whereby the positions of the bores in the adaptor and in the extraction system are positioned to coincide.

4. A coupling member according to claim 2, wherein said adaptor includes bores arranged to match corresponding bores in the extraction system, and a recess for receiving therein a positioning pin, projecting from the extractor whereby the positions of the bores in the adaptor and in the extraction system are positioned to coincide.

5. A coupling member according to claim 1, wherein said connecting portion for the vessel mouth comprises a threaded surface.

6. A coupling member according to claim 1, wherein said connecting portion for the adaptor comprises a threaded surface which is threadably engaged with internal threads on the first connecting portion of said union nut.

7. A coupling member according to claim 1, wherein said adaptor includes communication bores adapted to receive at least one of a riser pipe and a dip pipe.

8. A coupling member according to claim 1 further comprising gas seal means for providing a substantially gas-tight seal between an extraction system and a container vessel when coupled together.

9. A coupling member according to claim 8, wherein said gas seal means comprises recesses in said adaptor having seal rings disposed therein.

10. A coupling member according to claim 9 wherein said seal rings are O-rings.

11. A coupling member according to claim 1, made of a material inert to the contents of a vessel with which it is to be employed.

12. A coupling member according to claim 11, made of polytetrafluoroethylene/ethylene-propylene-diene polymer.

13. In a two-way, double bore, extraction system for use in extracting the contents of vessels, the improvement comprising a coupling member connected to said two way extraction system for coupling to a vessel, with said coupling member comprising two parts, an adaptor and union nut means, said adaptor being cylindrical and having, on its face connectable with the extraction system, a diameter compatible therewith, and on its opposite face connectable with the vessel mouth, a diameter compatible therewith, sealing means associated with the adaptor for effecting sealing thereof with the vessel mouth and said union nut means having a first connecting portion adapted for being coupled to the vessel mouth and a second connecting portion suitably movable with respect to the first connecting portion coupled to the extraction system, and said first connecting portion housing said adaptor.

14. In a vessel adapted for containing substances to be extracted by a two-way double-bore, extraction system, the improvement comprising a coupling member connected to said vessel with said coupling member comprising two parts, an adaptor and union nut means, said adaptor being cylindrical and having, on its face connectable with the extraction system, a diameter compatible therewith, and on its opposite face connectable with a vessel mouth, a diameter compatible therewith, sealing means associated with the adaptor for effecting sealing thereof with the vessel mouth and said union nut means having a first connecting portion coupled to the vessel mouth and a second connecting portion rotatably moveable with respect to the first connecting portion adapted for being coupled to the extraction system, and said connecting portion housing said adaptor.

15. A coupling member for coupling the externally threaded mouth of a vessel containing a liquid with gases evolving therefrom to a two-way, double-bore extraction system, the coupling member comprising:

an internal seal seat on the mouth of the vessel;

a first union nut, the first union nut having an internal threaded portion extending from one end for threadably engaging the externally threaded mouth of the vessel and having at the other end a smooth internal bore portion terminating with a shoulder adjacent the internal threaded portion and an externally threaded portion outside of the internally threaded portion;

an adaptor having central and lateral bores extending generally in an axial direction therethrough, the adaptor having a deformable sealing means at one end for sealing engagement with the internal seal seat on the externally threaded mouth of the vessel and a flange portion thereof having a diameter slightly less than that of the smooth bore of the first union nut; the flange being engaged by the shoulder on the first portion, a longitudinally extending portion on the adaptor coaxially received in the first union nut;

a second union nut, the second union nut having an internally threaded flange portion for the threadable engagement with the externally threaded flange portion on the first union nut, an internally projecting annular flange on the second union nut defining a circular opening of a selected diameter;

the extractor having a central bore and a lateral bore alignable with the central and lateral bores of the adaptor, the extractor being cylindrical and having a diameter less than the circular opening defined by the flange of the second union nut and less than the smooth bore of the first union nut, and a flange on the extractor for abutting the flange on the second union nut to retain the extractor within the second union nut, and means disposed between the extractor and adaptor for effecting alignment of the lateral bores of the extractor and adaptor upon abutting the adaptor to the extractor.

16. The coupling of claim 15, wherein the means for effecting alignment is a longitudinally projecting pin on the extractor and a longitudinally extended bore in the adaptor for receiving the pin.

17. The coupling of claim 15, wherein the central bore of the adaptor has an internally threaded portion spaced from the other end thereof.

18. The coupling of claim 16, wherein the lateral and central bores in the adaptor have enlarged openings at the other end thereof.

19. The coupling member of claim 15, wherein the member is made of polytetrafluoroethylene/ethylene-propylene-diene polymer.

20. The coupling member of claim 15, wherein the longitudinally extending portion of the adaptor is smooth and the flange portion of the adaptor is just inboard of the deformable sealing means.

21. The coupling member of claim 15, wherein the longitudinally extending portion of the adaptor is externally threaded and is threadably received in the internally threaded portion of the first union nut.

* * * * *